US010082935B2

(12) United States Patent
Harrison et al.

(10) Patent No.: US 10,082,935 B2
(45) Date of Patent: Sep. 25, 2018

(54) VIRTUAL TOOLS FOR USE WITH TOUCH-SENSITIVE SURFACES

(71) Applicant: Carnegie Mellon University, Pittsburgh, PA (US)

(72) Inventors: Christopher Harrison, Pittsburgh, PA (US); Julia Schwarz, Pittsburgh, PA (US); Robert Bo Xiao, Pittsburgh, PA (US); Scott E. Hudson, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 13/863,193

(22) Filed: Apr. 15, 2013

(65) Prior Publication Data
US 2014/0310631 A1    Oct. 16, 2014

(51) Int. Cl.
*G06F 3/0484*       (2013.01)
*G06F 3/0488*       (2013.01)

(52) U.S. Cl.
CPC ........ *G06F 3/0484* (2013.01); *G06F 3/04883* (2013.01); *G06F 2203/04806* (2013.01); *G06F 2203/04808* (2013.01)

(58) Field of Classification Search
CPC ........... G06F 2203/041; G06F 3/03547; G06F 3/041; G06F 3/0412; G06F 3/0414;
(Continued)

(56) References Cited

U.S. PATENT DOCUMENTS

| | | | | |
|---|---|---|---|---|
| 5,483,261 A | * | 1/1996 | Yasutake | G06F 3/0425 178/18.03 |
| 5,867,163 A | * | 2/1999 | Kurtenbach | G06F 8/34 715/840 |

(Continued)

FOREIGN PATENT DOCUMENTS

| | | |
|---|---|---|
| CN | 1797305 A | 7/2006 |
| CN | 102789332 A | 11/2012 |
| EP | 1659481 A2 | 5/2006 |

OTHER PUBLICATIONS

PCT International Search Report and Written Opinion for PCT/CA2013/000292, dated Jul. 8, 2013, 10 Pages.
(Continued)

*Primary Examiner* — Grant Sitta
(74) *Attorney, Agent, or Firm* — Amin, Turocy & Watson, LLP

(57) ABSTRACT

An electronic device includes a touch-sensitive surface, for example a touch pad or touch screen. The user interacts with the touch-sensitive surface, producing touch interactions. Some of these touch interactions may be detected as indicative of a grasp for manipulating a physical tool (e.g., the grasp for holding a pen). When these touch interactions are encountered, a corresponding virtual tool is instantiated. The virtual tool controls an action on the electronic device that is similar to an action that can be performed by the physical tool. For example, the virtual pen can be used to draw on the display, whereas the physical pen draws on paper. A representation of the virtual tool is also displayed on a display for the electronic device, possibly providing additional affordances, at a location that corresponds to a location of the detected touch interaction.

32 Claims, 6 Drawing Sheets

(58) Field of Classification Search
CPC ...... G06F 3/0416; G06F 3/0418; G06F 3/046;
G06F 3/047; G06F 2203/04107; G06F
2203/013; G06F 2203/014; G06F 3/0484;
G06F 3/04883; G06F 2203/04806; G06F
2203/04808; H05K 9/0073; H05K
9/0079; H05K 9/0081; H05K 9/0088
USPC .................................................. 345/156–173
See application file for complete search history.

(56) References Cited

U.S. PATENT DOCUMENTS

| | | | | |
|---|---|---|---|---|
| 6,028,593 | A * | 2/2000 | Rosenberg | A63F 13/10 345/156 |
| 6,222,465 | B1 * | 4/2001 | Kumar | G06F 3/017 341/20 |
| 6,337,698 | B1 * | 1/2002 | Keely, Jr. | G06F 3/0483 715/777 |
| 6,772,396 | B1 | 8/2004 | Cronin et al. | |
| 7,050,955 | B1 * | 5/2006 | Carmel | G06T 19/00 345/418 |
| 7,084,884 | B1 * | 8/2006 | Nelson | G06F 3/014 345/156 |
| 7,212,197 | B1 * | 5/2007 | Schkolne | G06T 19/20 345/419 |
| 7,443,396 | B2 * | 10/2008 | Ilic | 345/440.1 |
| 7,581,194 | B2 * | 8/2009 | Iwema et al. | 715/810 |
| 8,086,971 | B2 * | 12/2011 | Radivojevic | G06F 1/1626 715/863 |
| 8,154,524 | B2 * | 4/2012 | Wilson | G06F 17/5009 178/18.01 |
| 8,253,744 | B2 * | 8/2012 | Macura | G06F 3/0425 345/178 |
| 8,441,790 | B2 | 5/2013 | Pance et al. | |
| 8,670,632 | B2 * | 3/2014 | Wilson | G06F 3/0421 345/174 |
| 8,760,395 | B2 * | 6/2014 | Kim | G06F 3/011 345/156 |
| 9,030,498 | B2 * | 5/2015 | Galor | G06F 3/017 345/158 |
| 9,182,882 | B2 * | 11/2015 | Fowler | G06T 17/30 |
| 9,377,863 | B2 * | 6/2016 | Bychkov | G06F 3/017 |
| 9,557,852 | B2 | 1/2017 | Tsai et al. | |
| 2002/0126161 | A1 * | 9/2002 | Kuzunuki | G06F 3/033 715/863 |
| 2004/0141010 | A1 * | 7/2004 | Fitzmaurice et al. | 345/810 |
| 2006/0010400 | A1 * | 1/2006 | Dehlin et al. | 715/856 |
| 2008/0117168 | A1 * | 5/2008 | Liu | G06F 1/1616 345/158 |
| 2008/0168403 | A1 * | 7/2008 | Westerman | G06F 3/04883 715/863 |
| 2008/0180406 | A1 * | 7/2008 | Han | G06F 3/04883 345/173 |
| 2008/0244468 | A1 * | 10/2008 | Nishihara | G06F 3/017 715/863 |
| 2009/0073144 | A1 * | 3/2009 | Chen | G06F 3/0231 345/179 |
| 2009/0095540 | A1 * | 4/2009 | Zachut | G06F 3/044 178/18.03 |
| 2009/0178011 | A1 * | 7/2009 | Ording | G06F 9/453 715/863 |
| 2009/0318192 | A1 | 12/2009 | Leblanc et al. | |
| 2010/0306649 | A1 * | 12/2010 | Russ | G06F 3/04883 715/702 |
| 2011/0145706 | A1 * | 6/2011 | Wilson | G06F 3/041 715/702 |
| 2011/0164029 | A1 * | 7/2011 | King | G06F 3/04883 345/419 |
| 2011/0169778 | A1 * | 7/2011 | Nungester | G06F 3/03542 345/175 |
| 2011/0175821 | A1 * | 7/2011 | King | 345/173 |
| 2011/0261083 | A1 * | 10/2011 | Wilson | G06F 3/016 345/676 |
| 2011/0298798 | A1 | 12/2011 | Krah | |
| 2012/0051596 | A1 | 3/2012 | Darnell et al. | |
| 2012/0206330 | A1 * | 8/2012 | Cao | G06F 3/0383 345/156 |
| 2012/0287076 | A1 * | 11/2012 | Dao | G06F 1/1626 345/174 |
| 2012/0313969 | A1 * | 12/2012 | Szymczyk et al. | 345/633 |
| 2013/0027404 | A1 | 1/2013 | Sarnoff | |
| 2013/0335333 | A1 * | 12/2013 | Kukulski | G06F 3/04845 345/173 |
| 2014/0104274 | A1 * | 4/2014 | Hilliges | G06F 3/011 345/424 |
| 2014/0208275 | A1 * | 7/2014 | Mongia | G06F 3/14 715/863 |
| 2015/0077378 | A1 * | 3/2015 | Duffield | G06F 3/04883 345/173 |

OTHER PUBLICATIONS

PCT International Search Report and Written Opinion for PCT/US2014/33380, dated Mar. 13, 2015, 10 Pages.
Chinese Office Action dated Apr. 21, 2017 for Chinese Patent Application No. 201480022056.5, 23 pages (with translation).
Chinese Office Action dated Feb. 9, 2018 for Chinese Patent Application No. 201480022056.5, 19 pages (with translation).
European Office Action dated Feb. 26, 2018 for European Patent Application No. 14785422.8, 7 pages.
European Search Report dated Aug. 11, 2016 for European Patent Application No. 14785422.8, 8 pages.

* cited by examiner

VIRTUAL TOOLS FOR USE WITH TOUCH-SENSITIVE SURFACES

BACKGROUND OF THE INVENTION

1. Field of the Invention

This invention relates generally to interacting with electronic devices, for example via a touch-sensitive surface.

2. Description of the Related Art

Many touch pads and touch screens today are able to support a small set of gestures. For example, one finger is typically used to manipulate a cursor or to scroll the display. Another example is using two fingers in a pinching manner to zoom in and out of content, such as a photograph or map. However, this is a gross simplification of what fingers and hands are capable of doing. Fingers are diverse appendages, both in their motor capabilities and their anatomical composition. Furthermore, fingers and hands can also be used to manipulate tools, in addition to making gestures themselves.

Thus, there is a need for better utilization of the capabilities of fingers and hands to control interactions with electronic devices.

SUMMARY OF THE INVENTION

The present invention allows users to instantiate and manipulate virtual tools in a manner similar to how they grasp and manipulate the corresponding physical tools.

In one aspect, an electronic device includes a touch-sensitive surface, for example a touch pad (which does not also function as a display) or touch screen (which does also function as a display). The user interacts with the touch-sensitive surface, producing touch interactions. Some of these touch interactions may be detected as indicative of a grasp for manipulating a physical tool (e.g., the grasp for holding a pen). When these touch interactions are encountered, a corresponding virtual tool is instantiated. The virtual tool controls an action on the electronic device that is similar to an action that can be performed by the physical tool in the real world. For example, the virtual pen can be used to draw on the display, whereas the physical pen draws on paper. An image (or other representation) of the virtual tool is also displayed on a display for the electronic device, at a location that corresponds to a location of the detected touch interaction.

The action can be controlled by the virtual tool in different ways. For some virtual tools, detecting the correct touch interaction and instantiating the virtual tool may also initiate a corresponding action. For example, a virtual magnifying glass may immediately magnify an area of the display upon instantiation. For other virtual tools, additional actions may be required to specify actions. For example, a virtual pen may require subsequent translation of the touch interaction in order to draw a line on the display. As another example, a virtual camera may require a subsequent motion mimicking pressing a shutter button in order to capture an image. The virtual tool may also move, rotate and/or change in response to these subsequent actions.

In one approach, touch interactions are classified based on patterns of individual touch contacts. For example, virtual tools may be assigned only to those touch interactions that have three or more simultaneous touch contacts, leaving single-touch and two-touch patterns for existing functions such as scroll or zoom. These more complex touch contact patterns can be classified based on the number of touch contacts, as well as features such as position, shape, size and/or orientation of the touch contacts, both individually and as a whole.

In another aspect, the type of touch contacts reported by a touch-sensitive surface may vary. In some systems, a touch screen might report a series of touch points (e.g., x/y locations, sometimes with major and minor axes). Other touch screens might provide a two-dimensional image of capacitance, infrared reflectance, z-distance, or other sensing approaches. We use the term "touch contacts" generically to cover all types of touch technologies and capabilities.

Examples of virtual tools include the following. Virtual pen, pencil, paint brush, highlighter and other writing instruments may be used for drawing lines, digital painting, highlighting and other similar actions. Different types of virtual erasers may be used for erasing. Virtual ruler, tape measure and other distance measuring instruments may be used for functions related to lengths or distances. Virtual scissors, knife and other cutting tools may be used for digital cutting. Virtual camera may be used for image capture. Virtual magnifier may be used for image zoom. Virtual tweezers and other grasping instruments may be used for digital grabbing.

Other aspects of the invention include methods, devices, systems, components and applications related to the approaches described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
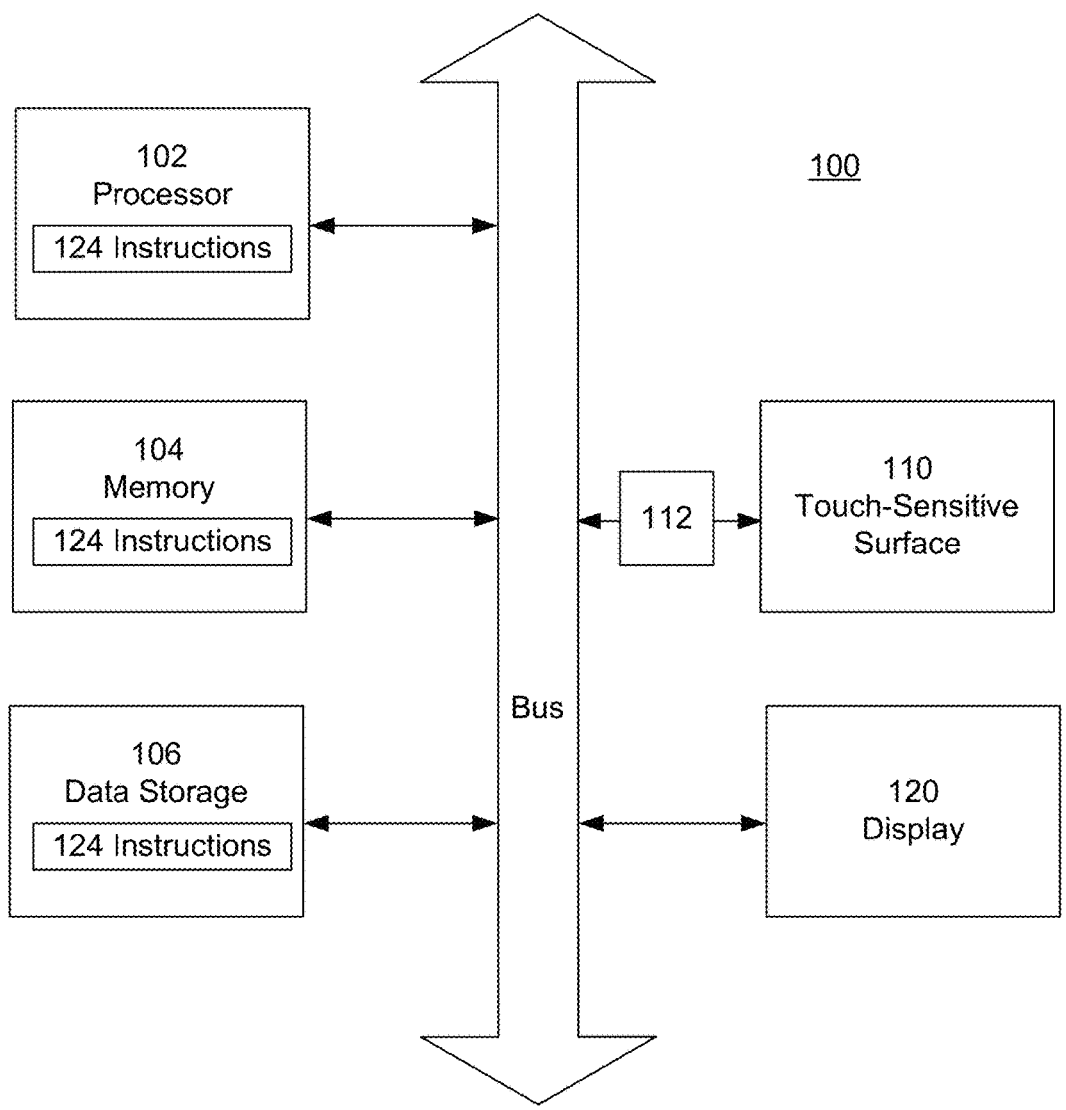
FIG. 1 is a block diagram of an electronic device according to the present invention.

FIG. 1 is a block diagram of an electronic device 100 according to the present invention. The device 100 includes a touch-sensitive surface 110, for example a touch pad or touch screen. It also includes computing resources, such as processor 102, memory 104 and data storage 106 (e.g., an optical drive, a magnetic media hard drive or a solid state drive). Detection circuitry 112 provides an interface between the touch-sensitive surface 110 and the rest of the device 100. Instructions 124 (e.g., software), when executed by the processor 102, cause the device to perform certain functions. In this example, instructions 124 include a touch analysis module that analyzes the user interactions with the touch-sensitive surface 110. The instructions 124 also allow the processor 102 to control a display 120 and to perform other actions on the electronic device.

In a common architecture, the data storage 106 includes a machine-readable medium which stores the main body of instructions 124 (e.g., software). The instructions 124 may also reside, completely or at least partially, within the memory 104 or within the processor 102 (e.g., within a processor's cache memory) during execution. The memory 104 and the processor 102 also constitute machine-readable media.

In this example, the different components communicate using a common bus, although other communication mechanisms could be used. As one example, the processor 102 could act as a hub with direct access or control over each of the other components.

The device 100 may be a server computer, a client computer, a personal computer (PC), tablet computer, handheld mobile device, or any device capable of executing instructions 124 (sequential or otherwise) that specify actions to be taken by that device. Further, while only a single device is illustrated, the term "device" shall also be taken to include any collection of devices that individually or jointly execute instructions 124 to perform any one or more of the methodologies discussed herein. The same is true for each of the individual components. For example, the processor 102 may be a multicore processor, or multiple processors working in a coordinated fashion. It may also be or include a central processing unit (CPU), a graphics processing unit (GPU), a network processing unit (NPU), a digital signal processor (DSP), one or more application specific integrated circuits (ASICs), or combinations of the foregoing. The memory 104 and data storage 106 may be dedicated to individual processors, shared by many processors, or a single processor may be served by many memories and data storage.

As one example, the device 100 could be a self-contained mobile device, such as a cell phone or tablet computer with a touch screen. In that case, the touch screen serves as both the touch-sensitive surface 110 and the display 120. As another example, the device 100 could be implemented in a distributed fashion over a network. The processor 102 could be part of a cloud-based offering (e.g., renting processor time from a cloud offering), the data storage 106 could be network attached storage or other distributed or shared data storage, and the memory 104 could similarly be distributed or shared. The touch-sensitive surface 110 and display 120 could be user I/O devices to allow the user to interact with the different networked components.

Figures 2, 3:
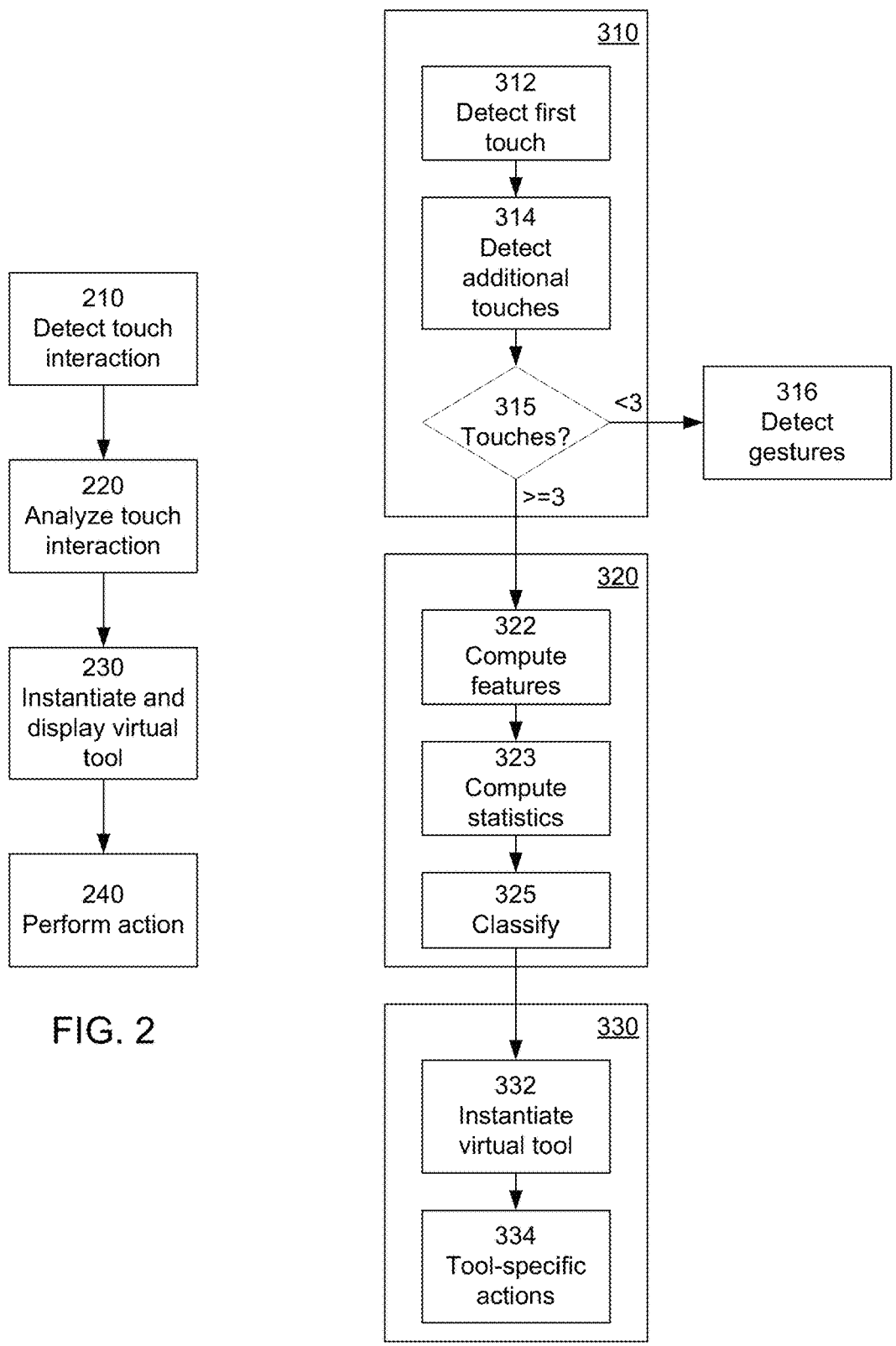
FIG. 2 is a flow diagram illustrating touch interaction using the device of FIG. 1.
FIG. 3 is a flow diagram illustrating one approach to analyzing touch interactions.

FIG. 2 is a flow diagram illustrating touch interaction using device 100. The user interacts with the touch-sensitive surface 110, for example his hand(s) may form certain poses which are meant to instruct the electronic device to perform corresponding actions. The touch-sensitive surface 110 and detection circuitry 112 detect 210 this touch interaction. For example, the touch-sensitive display may be based on resistive, capacitive, optical, acoustic (e.g., surface acoustic wave), force sensing materials (e.g., pressure, shear), piezo material, or other technologies that form the underlying basis for the touch interaction. Whatever the underlying principle of operation, touches on the touch-sensitive surface will result in signals. However, these raw signals typically are not directly usable in a digital computing environment. For example, the signals may be analog in nature. The detection circuitry 112 typically provides an intermediate stage to process and/or condition these signals so that they are suitable for use in a digital computing environment.

A touch analysis module (implemented by instructions 124 in this example) analyzes 220 the detected touch interaction as an initial step to determine the appropriate actions to take. In this example, the analysis determines whether the touch interaction is indicative of a grasp for manipulating a physical tool. If it is, then the electronic device 100 instantiates a corresponding virtual tool that controls an action similar to an action that may be taken by the physical tool. For example, the user may form his hand into the shape for grasping a physical pen, which is intended to instruct the device 100 to instantiate a virtual pen to draw on the display 120. As another example, the user may form two hands into the shape for grasping and operating a physical camera, which is intended to instruct the device 100 to instantiate a virtual camera to take a screen shot or to operate a physical camera within the device. The touch analysis module 124 determines which of these virtual tools, if any, are indicated by the detected touch interaction.

Based on this analysis, the processor 102 then takes the appropriate actions. It instantiates 230 the corresponding virtual tool and causes an image (or other representation) of the virtual tool to be displayed 230 on the display 120. It also causes any corresponding actions to be performed 240. In the pen example, when the pen grasp is identified 220, then a virtual pen is instantiated and an image of a virtual pen is displayed 230. The user further manipulates the virtual tool (e.g., the virtual pen may move around on the display 120 as the user's grasp moves around on the touch-sensitive surface 110), and the corresponding action of drawing a line also takes place 240. In the camera example, when the camera grasp is identified 220, then the virtual camera is instantiated and an image of a camera (or a viewfinder, or other image representing the virtual camera) is displayed. The virtual camera may be further manipulated, and the corresponding action of screen capture also takes place 240. Note the correspondence between the physical world and the virtual world. In the physical world, the user makes a grasp appropriate for handling a physical tool. This grasp is detected through the touch-sensitive surface. The corresponding virtual tool is instantiated and displayed, and the electronic device takes actions that are similar to actions that could be performed by the physical tool.

FIG. 3 is a flow diagram illustrating one approach to analyzing touch interactions. This approach has been successfully implemented on an iPad tablet computer running iOS. The software was implemented in Objective-C++ using the OpenFrameworks application framework. At a high level, this implementation captures 310 the user's touches, classifies 320 the touches using a machine-learning classifier, and then instantiates 330 the user's requested virtual tool.

To capture 310 the user's touch interaction, the system detects 312 a first user touch on the touch screen and then waits 314 thirty milliseconds for additional touches. The system captures 314 the touch contacts reported by the touch screen up to that point, and the touches for these contacts are considered to be simultaneous. The delay allows the touch screen to have enough time to report all touch contacts, while avoiding excessive latency in instantiating the virtual tool. Other wait times are possible. In this particular example, all virtual tools require three or more simultaneous touches. Therefore, if 315 there are two or fewer touches in the captured set, no further classification with respect to virtual tools is needed 316. One-touch or two-touch interactions may be further interpreted as starting a traditional action, such as tap, pan, pinch-to-zoom, or rotation. This approach means virtual tools can be added as extra functionality for those who have prior experience with one- and two-touch gestures.

Otherwise, the system proceeds to classify 320 the tool based on the touch contact pattern formed by the individual touches or touch contacts. In this particular implementation, the system computes 322 a set of features that are a function of the pattern of touch contacts (referred to as the touch contact pattern) and also the x-y positions and the sizes of the individual touch contacts. In this example, the feature set was chosen specifically to be rotation invariant, so that the virtual tools can be instantiated at any angle. This exemplary feature set includes the number of touch contacts, the total touch area of the touch contact pattern (i.e., total area for all touch contacts), and the magnitude of the first and second principle components of the touch contact pattern (i.e., the lengths of the major and minor axes of the touch contact pattern). This exemplary feature set also computes 323 statistical quantities (mean, median, min, max, standard deviation) over four sets of data: distances between each pair of touch contacts, distance from each individual touch point to the centroid of the touch contact pattern, angles between consecutively-clockwise touches as measured from the centroid of the touch contact pattern, and the size of each touch contact.

This is just one example. Other features and/or statistics could be computed. For example, if a two-dimensional image of the touch contact pattern is available, an exemplary feature set could include a contour analysis, a histogram of oriented gradients (which counts occurrences of different gradient orientations), first and second principle components of the touch contacts in the touch image (e.g., scale-invariant feature transform), and/or Haar-like features.

The computed feature set 322 and statistical quantities 323 are used as input to a quadratic (non-linear) support vector machine classifier 325, which has been trained on previously recorded data. Other classifiers are possible, including decision trees, naive Bayes, and neural networks. The virtual tool indicated by the classifier 325 is then instantiated 332, making it visible on screen and enabling tool-specific actions 334.

The process shown in FIG. 3 is just one example. Other approaches will be apparent. For example, different features or combinations of features may be used to classify touch interactions. Individual touches may be characterized by size, shape, position, orientation, pressure, temporal duration, and/or contacting part (finger tip, finger nail, finger pad, knuckle, thumb, etc.). These quantities may be absolute or relative. For example, the size of a touch may be the absolute physical size of the touch contact, or the relative size compared to other touches in the touch interaction. As another example, the position may be the absolute position on the touch-sensitive surface, or the relative position within the overall touch contact pattern. Similar possibilities apply to features for the overall touch contact pattern. Temporal information, such as changes in the touch interaction over time, may also be used. Furthermore, information gathered from other sources may also be used to help classify the touch interaction, for example historical data about touch interactions or device usage.

FIGS. 4-8 illustrate different examples of virtual tools. Each figure has three parts A-C. Part A shows a hand grasping a physical tool. Part B shows a hand "grasping" the corresponding virtual tool. Part C shows an example touch contact (a simulated two-dimensional capacitive or pressure image) produced by the hand grasp of Part B.

Figure 4A:
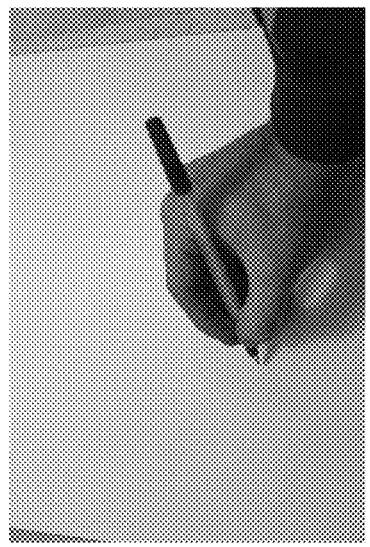
FIGS. 4A-4D illustrate use of a physical pen, use of a virtual pen, and two touch contact patterns for the virtual pen, respectively.
Figure 4B:
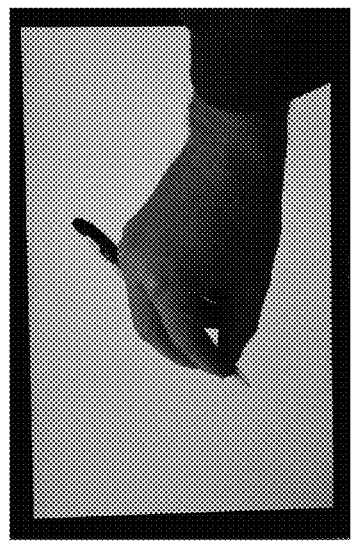
Figure 4C:
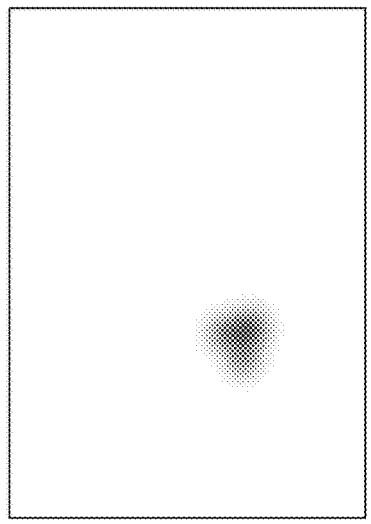

FIG. 4A shows a hand grasping a pen (or other writing instrument). FIG. 4B shows a touch screen displaying a virtual pen, with a hand "grasping" the virtual pen. The pen has just been instantiated on the touch screen. As the user moves his grasp, the virtual pen will draw onto content displayed on the touch screen. Note that the hand grasp is not exactly the same in FIGS. 4A and 4B. The grasp in FIG. 4B is more similar to a hand grasping a pen that is lying on top of the touch screen. FIG. 4C shows an example touch contact pattern (a simulated two-dimensional capacitive image) produced by the fingers of the hand grasp of FIG. 4B. In another example shown in FIG. 4D, touch contact 410 and touch contact 411 is a combination of the thumb, fingers, palm and other parts of the hand. Many other touch contacts are possible, possibly user specific, but all are exemplary of hand grasps of tools.

Figure 4D:
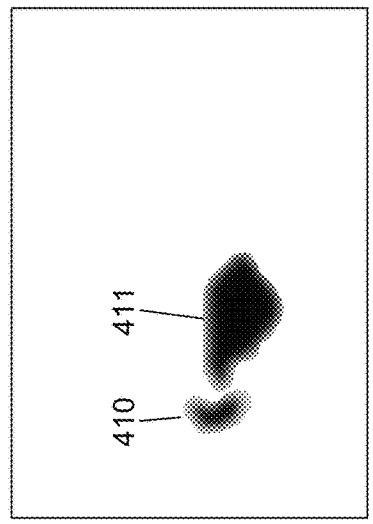
Figure 5A:
FIGS. 5A-5C illustrate use of a physical eraser, use of a virtual eraser, and a touch contact pattern for the virtual eraser, respectively.
Figure 5B:
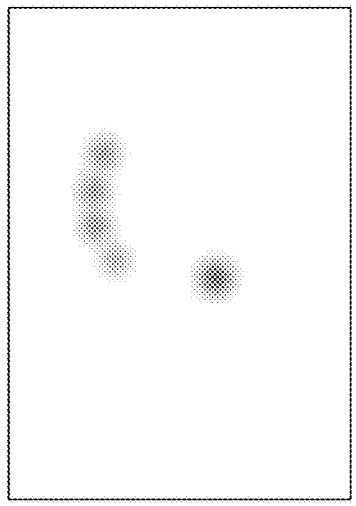
Figure 5C:
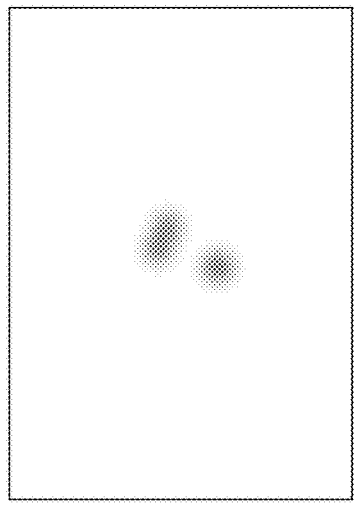
Figure 5D:
FIGS. 5D-5E illustrate use of a smaller virtual eraser, and a touch contact pattern for the smaller virtual eraser, respectively.
Figure 5E:
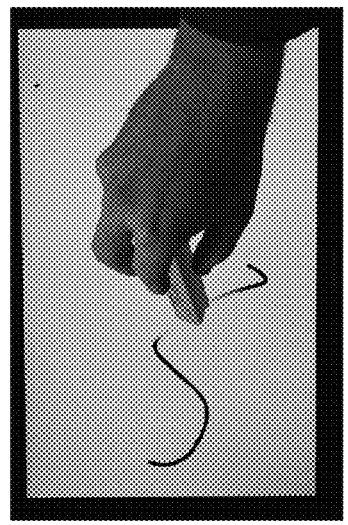

Note that, in one approach, the hand grasp is not required to be one specific grasp. Many different types of hand grasps may be classified as instantiating a virtual pen, for example. FIGS. 4C and 4D show different touch contacts produced by different hand grasps, but both of which are classified as instantiating a virtual pen. In this approach, users are not required to perform the same grasp exactly the same each time, or even the same grasp as other people. In one approach, a classifier supports different types of hand grasps. These may be several recognized ways to grasp a pencil for example. The classifer learns the different grasps.

FIG. 5 shows an example using a large eraser. FIG. 5A shows grasping a physical eraser, FIG. 5B shows grasping the virtual eraser that is erasing a broad swath. FIG. 5C is the corresponding touch contact pattern (a simulated two-dimensional capacitive image). Compare this to FIGS. 5D-5E. FIG. 5D shows grasping a smaller virtual eraser that erases a narrower swath, and FIG. 5E shows the corresponding touch contact pattern. The two erasers can be distinguished by different touch contact patterns. The touch contact pattern in FIG. 5C shows a thumb and four fingers while the touch contact pattern in FIG. 5E shows a thumb and only two fingers. Note also that the touch contact pattern in FIG. 5E can be distinguished by the classifier from that in FIG. 4C due to the different spacing between the thumb and the two fingers.

Figure 6A:
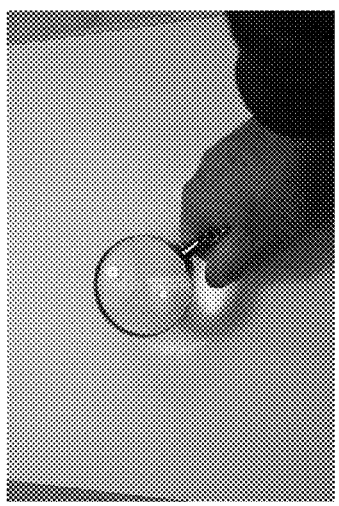
FIGS. 6A-6C illustrate use of a physical magnifier, use of a virtual magnifier, and a touch contact pattern for the virtual magnifier, respectively.
Figure 6B:
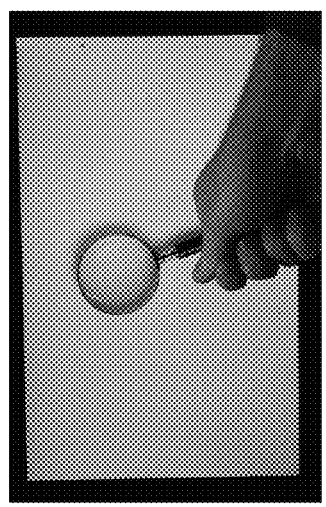
Figure 6C:
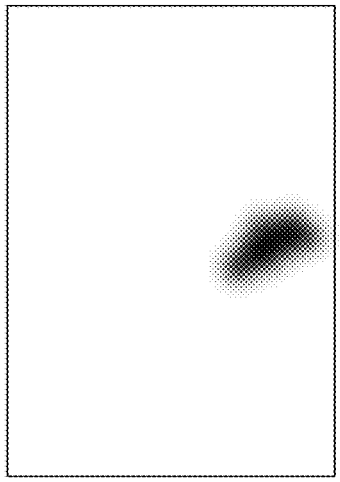

FIG. 6 shows an example using a virtual magnifier to control the action of image zoom. Once the magnifier grasp is identified, secondary actions may allow further control of the action. For example, the amount of zoom may be adjusted by secondary hand motions. In one example, one hand retains the magnifier grasp and the other hand motions the amount of zoom, or whether to increase or decrease zoom. Note also that the corresponding touch contact pattern in FIG. 6C (a simulated two-dimensional capacitive image) is not just finger tips. Pressing the hand to the touch screen creates a series of irregular contacts.

Figure 7A:
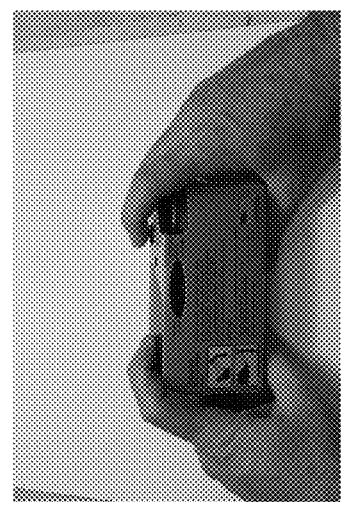
FIGS. 7A-7C illustrate use of a physical camera, use of a virtual camera, and a touch contact pattern for the virtual camera, respectively.
Figure 7B:
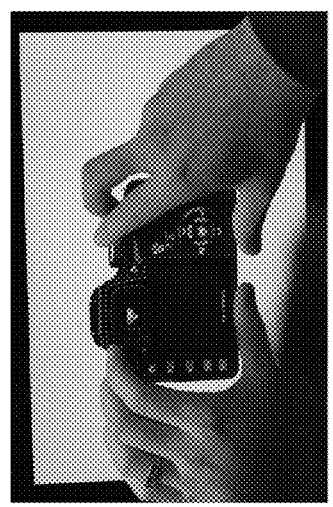
Figure 7C:
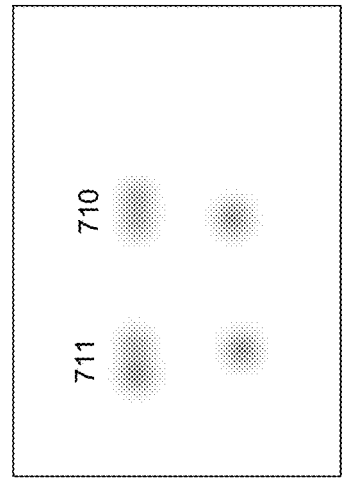

FIG. 7 shows an example using a virtual camera to control the action of image capture. This could be operation of the device's camera to capture images of the real world, or it could be capturing screen shots of the display. Note that the grasp involves two hands, which can be seen in the touch contact (a simulated two-dimensional capacitive image) of FIG. 7C. The three touch contacts 710 are the right thumb, index finger and middle finger; while the three touch contacts 720 are the left thumb, index finger and middle finger. Note also that the thumb touches are not finger tip touches. Rather, as can be seen in FIG. 7B, the side of the thumb is contacting the touch screen. This is just one example; other grasps are possible. The camera virtual tool is another example of a tool that could have secondary controls. Typically, there is a button on the upper right top of a camera, which can be depressed to take a photo. Thus, when using the camera virtual tool, the user can make a motion that appears as depressing his right index finger to trigger capturing an image. Additional controls such as zoom and flash may also be controlled by secondary controls, including other fingers.

Figure 8C:
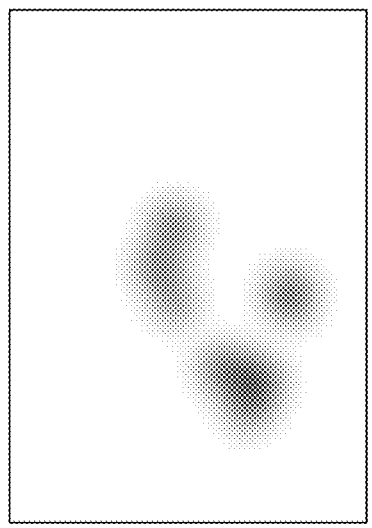
FIGS. 8A-8C illustrate use of a physical tape measure, use of a virtual tape measure, and a touch contact pattern for the virtual tape measure, respectively.
Figure 8B:
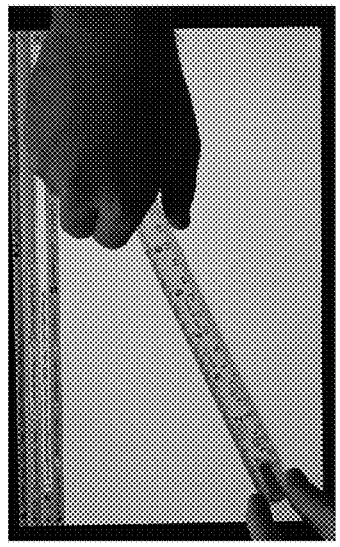
Figure 8A:
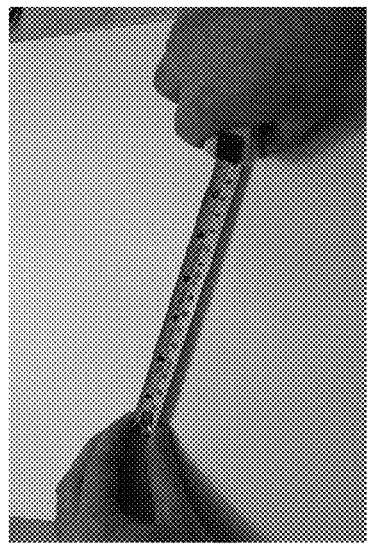

FIG. 8 shows an example using a virtual tape measure. As with the camera of FIG. 7, this grasp also uses two hands. The corresponding action could be measuring a distance, displaying a distance, or other types of distance functions. Note that the touch contact pattern shown in FIG. 8C is for use of a virtual tape measure, but not exactly for the position shown in FIG. 8B.

FIGS. 4-8 are just a few examples. Other examples will be apparent. For example, for the camera in FIG. 7, the positions of the touches could vary from that shown in FIG. 7C. The number of touch points can also vary. The camera could be held using just four fingers forming a rough rectangle. People can hold objects differently. In one approach, the system is preferably designed to recognize a wide variety of grasps, not just one.

Other virtual tools can also be realized. For example, virtual paint brushes can be used to control digital painting, and virtual highlighters can be used to control highlighting. There can also be a hierarchy of functions. The pen grasp, pencil grasp, paint brush grasp and highlighter grasp are fairly similar. Rather than trying to distinguish them based solely on the touch interactions, when one of the grasps is encountered, the system may produce a menu listing these different options. The user then selects which virtual tool he would like to use.

The following are some more examples. Virtual scissors, knives, scalpel or other types of cutting instruments may be used to control digital cutting. Virtual tweezers, pliers or other grasping instruments may be used to control digital grabbing of objects. Virtual imprint tools may be used to control digital stamping. Virtual pushpins or other fasteners may be used to control digital "pinning" objects together.

As another variation, grasps may be recognized based on information beyond or other than just the touch contact patterns. For example, the user interface may include three-dimensional imaging of the hands (e.g., using a depth camera) and this information could additionally be used to determine the grasps.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. A method of virtual tool interaction between a user and an electronic device having a touch screen, the method comprising:

detecting a touch interaction between the user's hand(s) and the touch screen, wherein the touch interaction is characterized by a touch contact pattern including at least three simultaneous touch contacts on the touch screen by the user's hand(s) while the user's hand(s) are empty but formed into a shape defined by a grasp that is suitable for manipulating a particular physical tool;

distinguishing between a first touch interaction, which has a first touch contact pattern associated with a first set of the at least three simultaneous touch contacts, and a second touch interaction, which has a second touch contact pattern associated with a second set of the at least three simultaneous touch contacts, based at least in part on at least one difference between at least one of position, shape, size, orientation, pressure, or contacting part(s) of the user's hand(s) of the first set of the at least three simultaneous touch contacts and the second set of the at least three simultaneous touch contacts;

classifying the touch interaction as indicative of the particular physical tool based at least in part on the touch interaction being classified as any of a plurality of different touch interactions for user's hand(s) formed into shapes defined by grasps that are suitable for manipulating the particular physical tool, wherein the plurality of different touch interactions associated with different ways for manipulating the particular physical tool are all classified as indicative of the particular physical tool, wherein the classifying the touch interaction includes classifying the touch interaction based on the distinguishing between the first touch interaction and the second touch interaction, and wherein the first touch interaction and second touch interaction correspond to different virtual tools; and in response to classifying the touch interaction as indicative of the particular physical tool, instantiating a virtual tool corresponding to the particular physical tool, wherein the virtual tool controls an action on the electronic device that is similar to an action that can be performed by the particular physical tool and instantiating the virtual tool includes displaying a representation of the virtual tool at a location on the touch screen such that it appears the user is grasping the virtual tool.

2. The method of claim 1, further comprising:

in response to detecting the touch interaction, performing the action controlled by the virtual tool on the electronic device.

3. The method of claim 1, further comprising:

detecting motion of the touch interaction; and in response to detecting the motion, adjusting the representation of the virtual tool based at least in part on the detecting the motion and performing the action on the electronic device based at least in part on the detecting the motion.

4. The method of claim 1, further comprising:

after instantiating the virtual tool, detecting an additional user action made by the user; and in response to detecting the additional user action, performing the action on the electronic device based at least in part on the additional user action.

5. The method of claim 1, wherein the representation of the virtual tool is an image of the particular physical tool.

6. The method of claim 1, wherein the detecting the touch interaction includes determining at least one of a shape, an outline, a size, or an orientation of the touch contact pattern.

7. The method of claim 1, wherein the detecting the touch interaction includes determining a number of simultaneous touch contacts on the touch screen associated with the touch interaction.

8. The method of claim 1, wherein the detecting the touch interaction includes determining a relative positioning of the at least three simultaneous touch contacts on the touch screen associated with the touch interaction.

9. The method of claim 1, wherein the detecting the touch interaction includes determining a change in the touch interaction over time.

10. The method of claim 1, wherein the shape defined by the grasp that is suitable for manipulating the particular physical tool is associated with grasping the particular physical tool using one hand.

11. The method of claim 1, wherein the shape defined by the grasp that is suitable for manipulating the particular physical tool is associated with grasping the particular physical tool using two hands.

12. The method of claim 1, wherein the particular physical tool is a writing instrument, and the action on the electronic device is drawing with the virtual tool.

13. The method of claim 1, wherein the particular physical tool is a paintbrush, and the action on the electronic device is digital painting with the virtual tool.

14. The method of claim 1, wherein the particular physical tool is a highlighter, and the action is highlighting with the virtual tool.

15. The method of claim 1, wherein the particular physical tool is an eraser, and the action on the electronic device is erasing with the virtual tool.

16. The method of claim 1, wherein the particular physical tool is a distance measuring instrument, and the action on the electronic device is at least one of measuring a distance with the virtual tool or displaying the distance with the virtual tool.

17. The method of claim 1, wherein the electronic device is a display with a touch-sensitive surface.

18. The method of claim 1, wherein the particular physical tool is a cutting instrument, and the action on the electronic device is digital cutting with the virtual tool.

19. The method of claim 1, wherein the particular physical tool is a camera, and the action on the electronic device is image capture with the virtual tool.

20. The method of claim 1, wherein the particular physical tool is a magnifier, and the action on the electronic device is image zoom with the virtual tool.

21. The method of claim 1, wherein the particular physical tool is an imprint tool, and the action on the electronic device is digital stamping with the virtual tool.

22. The method of claim 1, wherein the particular physical tool is a grasping instrument, and the action on the electronic device is digital grabbing with the virtual tool.

23. The method of claim 1, wherein the particular physical tool is a fastener, and the action on the electronic device is digital pinning with the virtual tool.

24. The method of claim 1, wherein the electronic device is a phone with the touch screen.

25. The method of claim 1, wherein the electronic device is a tablet computer with the touch screen.

26. The method of claim 1, wherein the electronic device is a computer with the touch screen.

27. A machine-readable tangible storage medium having stored thereon data representing sequences of instructions, which when executed by an electronic device having a touch screen touch sensitive surface, cause the electronic device to perform a method comprising the steps of:

detecting a touch interaction between a user's hand(s) and the touch screen, wherein the touch interaction is characterized by a touch contact pattern including at least three simultaneous touch contacts on the touch screen by the user's hand(s) while the user's hand(s) are empty but formed into a shape defined by a grasp that is suitable for manipulating a particular physical tool;

distinguishing between a first touch interaction, which has a first touch contact pattern associated with a first set of the at least three simultaneous touch contacts, and a second touch interaction, which has a second touch contact pattern associated with a second set of the at least three simultaneous touch contacts, based at least in part on at least one difference between at least one of position, shape, size, orientation, pressure, or contacting part(s) of the user's hand(s) of the first set of the at least three simultaneous touch contacts and the second set of the at least three simultaneous touch contacts;

classifying the touch interaction as indicative of the particular physical tool based at least in part on the touch interaction being classified as any of a plurality of different touch interactions for user's hand(s) formed into shapes defined by grasps that are suitable for manipulating the particular physical tool, wherein the plurality of different touch interactions associated with different ways for manipulating the particular physical tool are all classified as indicative of the particular physical tool, wherein the classifying the touch interaction includes classifying the touch interaction based on the distinguishing between the first touch interaction and the second touch interaction, and wherein the first touch interaction and second touch interaction correspond to different virtual tools; and in response to classifying the touch interaction as indicative of the particular physical tool, instantiating a virtual tool corresponding to the particular physical tool, wherein the virtual tool controls an action on the electronic device that is similar to an action that can be performed by the particular physical tool and instantiating the virtual tool includes displaying a representation of the virtual tool at a location on the touch screen such that it appears the user is grasping the virtual tool.

28. An electronic device comprising:

a touch screen;

detection circuitry coupled to the touch screen, for detecting a touch interaction between a user's hand(s) and the touch screen, wherein the touch interaction is characterized by a touch contact pattern including at least three simultaneous touch contacts on the touch screen by the user's hand(s) while the user's hand(s) are empty but formed into a shape defined by a grasp that is suitable for manipulating a particular physical tool;

a touch analysis module coupled to the detection circuitry, for distinguishing between a first touch interaction, which has a first touch contact pattern associated with a first set of the at least three simultaneous touch contacts, and a second touch interaction, which has a second touch contact pattern associated with a second set of the at least three simultaneous touch contacts, based at least in part on at least one difference between at least one of position, shape, size, orientation, pressure, or contacting part(s) of the user's hand(s) of the first set of the at least three simultaneous touch contacts and the second set of the at least three simultaneous touch contacts, and for classifying the touch interaction as indicative of the particular physical tool based at least in part on the touch interaction being classified as any of a plurality of different touch interactions for user's hand(s) formed into shapes defined by grasps that are suitable for manipulating the particular physical tool, wherein the plurality of different touch interactions associated with different ways for manipulating the particular physical tool are all classified as indicative of the particular physical tool, wherein the classifying the touch interaction includes classifying the touch interaction based on the distinguishing between the first touch interaction and the second touch interaction, and wherein the first touch interaction and second touch interaction correspond to different virtual tools; and a processor coupled to the touch analysis module, the processor for, in response to classifying the touch interaction as indicative of the particular physical tool, instantiating a virtual tool corresponding to the particular physical tool, wherein the virtual tool controls an action on the electronic device that is similar to an action that can be performed by the particular physical tool and instantiating the virtual tool includes displaying a representation of the virtual tool at a location on the touch screen such that it appears the user is grasping the virtual tool.

29. An electronic device comprising:

a touch screen;

means for detecting a touch interaction between the user's hand(s) and the touch screen, wherein the touch interaction is characterized by a touch contact pattern including at least three simultaneous touch contacts on the touch screen by the user's hand(s) while the user's hand(s) are empty but formed into a shape defined by a grasp that is suitable for manipulating a particular physical tool;

means for analyzing the touch interaction to distinguish between a first touch interaction, which has a first touch contact pattern associated with a first set of the at least three simultaneous touch contacts, and a second touch interaction, which has a second touch contact pattern associated with a second set of the at least three simultaneous touch contacts, based at least in part on at least one difference between at least one of position, shape, size, orientation, pressure, or contacting part(s) of the user's hand(s) of the first set of the at least three simultaneous touch contacts and the second set of the at least three simultaneous touch contacts, and to classify the touch interaction as indicative of the particular physical tool based at least in part on the touch interaction being classified as any of a plurality of different touch interactions for user's hand(s) formed into shapes defined by grasps that are suitable for manipulating the particular physical tool, wherein the plurality of different touch interactions associated with different ways for manipulating the particular physical tool are all classified as indicative of the particular physical tool, and wherein the means for analyzing includes means for analyzing the touch interaction based on distinguishing between the first touch interaction and the second touch interaction, and wherein the first touch interaction and second touch interaction correspond to different virtual tools; and means for, in response to classifying the touch interaction as indicative of the particular physical tool, instantiating a virtual tool corresponding to the particular physical tool, wherein the virtual tool controls an action on the electronic device that is similar to an action that can be performed by the particular physical tool and instantiating the virtual tool includes displaying a representation of the virtual tool at a location on the touch screen such that it appears the user is grasping the virtual tool.

30. The method of claim 1, wherein the touch interaction is characterized by the touch contact pattern that includes a capacitive image.

31. The method of claim 1, further comprising:

learning that the plurality of different touch interactions associated with the different ways for manipulating the particular physical tool are all classified as indicative of the particular physical tool.

32. The method of claim 1, wherein each of the grasp, grasps, and different ways are all suitable for manipulating the particular physical tool.

* * * * *